(12) United States Patent
Meiroff et al.

(10) Patent No.: US 10,719,814 B1
(45) Date of Patent: *Jul. 21, 2020

(54) METHOD AND SYSTEM FOR TRANSFERRING FUNDS FROM AN ACCOUNT TO AN INDIVIDUAL

(75) Inventors: Netty Meiroff, Playa Del Rey, CA (US); Gordon Zahorik, Southampton, NJ (US)

(73) Assignee: Citicorp Credit Services, Inc. (USA), Long Island City, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/784,840

(22) Filed: Apr. 10, 2007

Related U.S. Application Data

(63) Continuation-in-part of application No. 09/378,961, filed on Aug. 23, 1999, which is a continuation of
(Continued)

(51) Int. Cl.
G06Q 20/04 (2012.01)
G06Q 20/10 (2012.01)
G06Q 40/02 (2012.01)

(52) U.S. Cl.
CPC ............ *G06Q 20/04* (2013.01); *G06Q 20/10* (2013.01); *G06Q 20/108* (2013.01); *G06Q 40/02* (2013.01)

(58) Field of Classification Search
CPC ...... G06Q 20/04; G06Q 20/10; G06Q 20/108; G06Q 40/02
(Continued)

(56) References Cited

U.S. PATENT DOCUMENTS 3,826,344 A    7/1974  Wahlberg ................. 194/206
4,114,027 A *  9/1978  Slater et al. .............. 705/43
(Continued)

FOREIGN PATENT DOCUMENTS

GB    2251098     6/1992
JP    64-017186   1/1989
(Continued)

OTHER PUBLICATIONS

Gennady Medvinsky and B. Clifford Neuman. NetCash: A design for practical electronic currency on the Internet. 1st Conf.—Computer & Comm. Security. Nov. 1993.*
(Continued)

*Primary Examiner* — Virpi H Kanervo
(74) *Attorney, Agent, or Firm* — Foley & Lardner LLP

(57) ABSTRACT

Methods and system for transferring funds supports funds transfers from a source account to a cash access file which can be accessed virtually twenty-four hours a day by both customers and non-customers. Cash may be transferred across international borders and dispensed in a currency different than that of the sender's source account and is made available to a recipient virtually as soon as the requested transfer is approved and confirmed by the sender. A subset of payees that is uniquely associated with the sender and includes a payee and a destination account for the payee is presented in a payee list database. Thereafter, a payee list is displayed for the sender at a terminal in response to entry of a request by the sender for a transfer of funds, and upon selection by the sender of a payee from the payee list and entry of a requested transfer amount, the requested amount is transferred e.g. to a branch of the sender's bank located in a different country via the network switch and, for example, thereafter routed to the payee's destination account in a different bank for withdrawal by the payee.

15 Claims, 13 Drawing Sheets

Related U.S. Application Data application No. 08/877,203, filed on Jun. 17, 1997, now Pat. No. 5,963,647.

(60) Provisional application No. 60/040,298, filed on Feb. 14, 1997.

(58) Field of Classification Search
USPC .............................. 705/1, 35, 40, 42, 43, 70
See application file for complete search history.

(56) References Cited

U.S. PATENT DOCUMENTS

| | | | |
|---|---|---|---|
| 4,319,336 A | 3/1982 | Anderson et al. | |
| 4,321,672 A | 3/1982 | Braun et al. | 705/42 |
| 4,341,951 A | 7/1982 | Benton | 705/41 |
| 4,498,000 A | 2/1985 | DeCavele et al. | 235/380 |
| 4,529,870 A | 7/1985 | Chaum | 235/380 |
| 4,707,592 A | 11/1987 | Ware | 235/379 |
| 4,766,293 A | 8/1988 | Boston | 705/41 |
| 4,773,001 A | 9/1988 | Blair et al. | 340/825.52 |
| 4,823,264 A | 4/1989 | Deming | |
| 4,926,368 A | 5/1990 | Morita et al. | 708/206 |
| 5,012,076 A | 4/1991 | Yoshida | 235/379 |
| 5,025,373 A | 6/1991 | Keyser, Jr. et al. | 705/42 |
| 5,157,717 A | 10/1992 | Hitchcock | 379/93.19 |
| 5,220,501 A * | 6/1993 | Lawlor et al. | 705/40 |
| 5,231,662 A | 7/1993 | van Rumpt et al. | 713/193 |
| 5,255,305 A | 10/1993 | Sattar | |
| 5,326,960 A * | 7/1994 | Tannenbaum | 235/379 |
| 5,336,870 A | 8/1994 | Hughes et al. | |
| 5,350,906 A | 9/1994 | Brody et al. | 235/379 |
| 5,367,561 A | 11/1994 | Adler et al. | 379/91.01 |
| 5,420,926 A | 5/1995 | Low et al. | |
| 5,424,938 A | 6/1995 | Wagner et al. | 705/42 |
| 5,440,634 A | 8/1995 | Jones et al. | 705/67 |
| 5,448,043 A | 9/1995 | Nakano et al. | 235/379 |
| 5,453,601 A * | 9/1995 | Rosen | G06Q 20/3676 705/65 |
| 5,455,407 A | 10/1995 | Rosen | 705/69 |
| 5,457,305 A | 10/1995 | Akel et al. | 705/45 |
| 5,465,206 A * | 11/1995 | Hilt et al. | 705/40 |
| 5,524,073 A | 6/1996 | Stambler | |
| 5,550,358 A | 8/1996 | Tait et al. | 235/380 |
| 5,590,196 A | 12/1996 | Moreau | |
| 5,650,604 A | 7/1997 | Marcous et al. | 235/379 |
| 5,659,165 A | 8/1997 | Jennings et al. | |
| 5,661,781 A | 8/1997 | DeJager | |
| 5,677,955 A | 10/1997 | Doggett et al. | 705/76 |
| 5,825,003 A | 10/1998 | Jennings et al. | 235/379 |
| 5,903,881 A | 5/1999 | Schrader et al. | 705/42 |
| 5,913,203 A | 6/1999 | Wong et al. | 705/39 |
| 5,915,023 A | 6/1999 | Bernstein | 705/75 |
| 5,937,396 A | 8/1999 | Konya | 705/43 |
| 5,963,647 A | 10/1999 | Downing et al. | |
| 6,081,792 A | 6/2000 | Cucinotta et al. | |
| 6,142,369 A | 11/2000 | Jonstromer | |
| 6,173,269 B1 | 1/2001 | Solokl et al. | |
| 6,505,178 B1 | 1/2003 | Flenley | |
| 7,096,003 B2 | 8/2006 | Joao et al. | |
| 7,720,754 B1 | 5/2010 | Gutierrez-Sheris | |
| 2002/0013711 A1 | 1/2002 | Ahuja et al. | |
| 2003/0024979 A1* | 2/2003 | Hansen | G06Q 20/00 235/379 |

FOREIGN PATENT DOCUMENTS

| | | | |
|---|---|---|---|
| JP | 07-170341 | 7/1995 | |
| WO | WO-9503582 A1 * | 2/1995 | G06Q 20/04 |
| WO | WO 95/12169 | 5/1995 | |
| WO | WO 96/26508 | 8/1996 | |
| WO | WO 97/04411 | 2/1997 | |
| WO | WO 98/19261 | 5/1998 | G06Q 30/00 |
| WO | WO 98/36521 | 8/1998 | G06Q 20/00 |

OTHER PUBLICATIONS

Australian Office Action dated Apr. 11, 2000 in related Australian Application No. 62636-98, 1 page.
Chilean Office Action dated Apr. 20, 2004 in related Chilean Application No. 328-98, English translation, 2 pages.
Chilean Office Action dated Mar. 15, 2006 in related Chilean Application No. 328-98, English translation, 2 pages.
European Communication dated May 3, 2004 in related European Application No. EP 98904857, 8 pages.
European Communication dated Aug. 29, 2005 in related European Application No. EP 9692547, 7 pages.
FACOM OS IV/F4 MSP APFS/X Instruction manual, SBAL/X External Net Edition (Financial Online Application Package), Japan, Fujitsu, Oct. 31, 1988, Second Edition, Japanese language with translation of Figure 1.7, 14 pages.
International Search Report dated Sep. 16, 1996 in related PCT Application No. PCT/US96/12132 filed Jul. 23, 1996, 3 pages.
International Search Report dated Jul. 22, 1998 in related PCT Application No. PCT/US98/01566 filed Feb. 4, 1998, 3 pages.
International Search Report dated Jun. 29, 1998 in related PCT Application No. PCT/US98/02014 filed Feb. 12, 1998, 1 page.
Japanese Office Action dated Nov. 1, 2005 in related Application No. JP 9-506958, English Translation, 3 pages.
Japanese Office Action dated Aug. 1, 2006 in related Application No. JP 9-506958, English Translation, 2 pages.
JP 07-170341 published Jul. 4, 1995, abstract only in English, downloaded from PAJ, 2 pages.
JP 64-017186 published Jan. 20, 1989, abstract only in English, downloaded from PAJ, 1 page.
Malaysian Office Action and Search Report dated Sep. 7, 2001 in related Malaysian application No. SD/PAT/1783588/GR/GK, filed Jul. 24, 1996, 4 pages.
Supplementary European Search Report dated Nov. 21, 2000 in related European Application No. EP 98904857 filed Feb. 14, 1997, 2 pages.
Supplementary European Search Report dated Jul. 3, 2002 in related European Application No. 96925437, 2 pages.
ATMs Give Wire Transfers a Run for the Money, Bank Network News, Jan. 28, 1998, 3 pages.

* cited by examiner

TRANSFER INSTRUCTION FILE

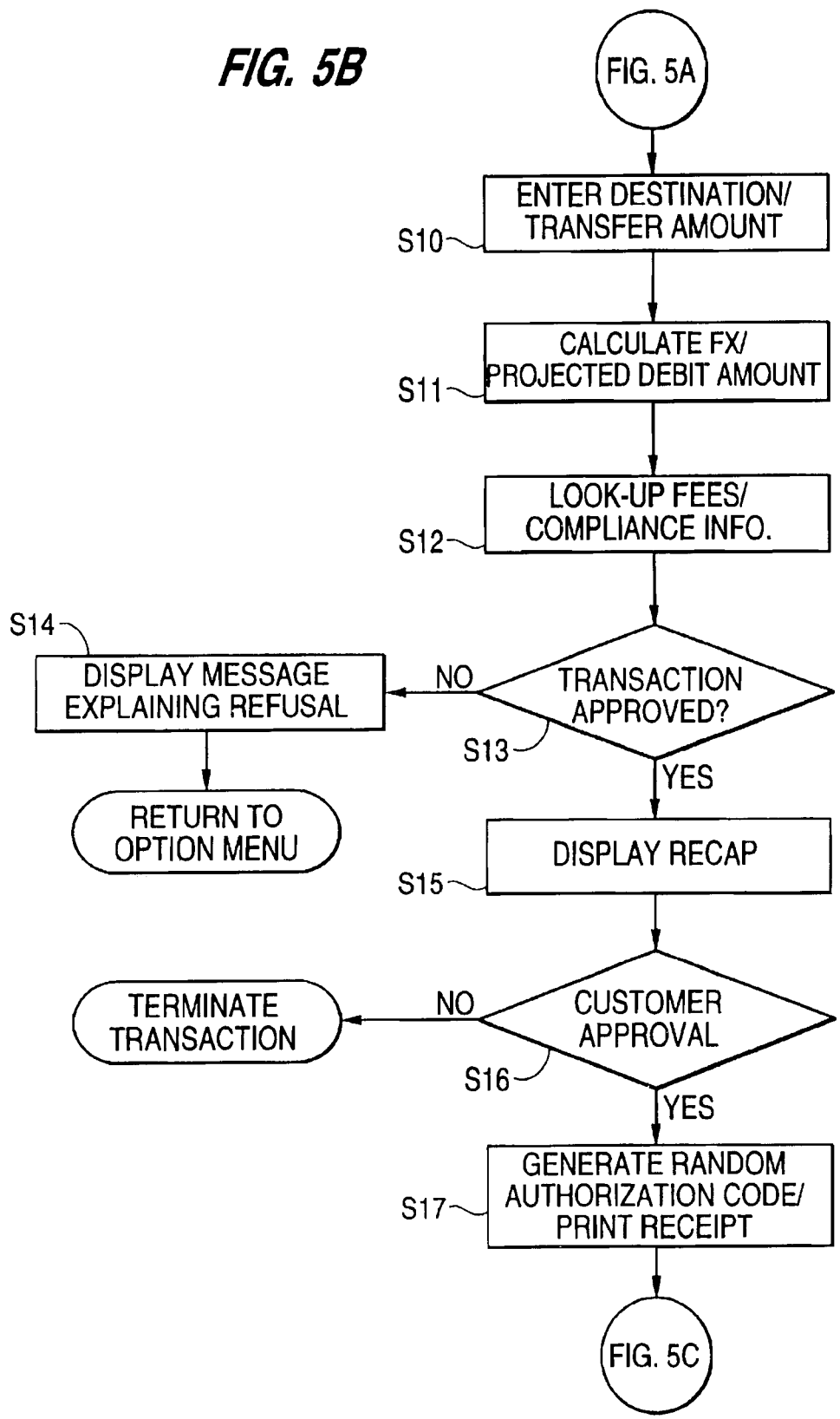

| DATA CONTAINED IN THE PAYEE LIST | SOURCE ACCOUNT | SENDER'S NAME | TRANSFER METHOD | TRANSFER CURRENCY | RECIPIENT BUSINESS | THIRD PARTY (IF APPLICABLE) | PAYEE NAME | DESTINATION ACCOUNT | LAST TRANSFER AMOUNT | LAST REFERENCE NUMBER | LAST SECRET CODE (E.G., ENCRYPTED) |
|---|---|---|---|---|---|---|---|---|---|---|---|
| 100 | 102 | 104 | 106 | 108 | 110 | 112 | 114 | 116 | 118 | 120 | |

*FIG. 7*

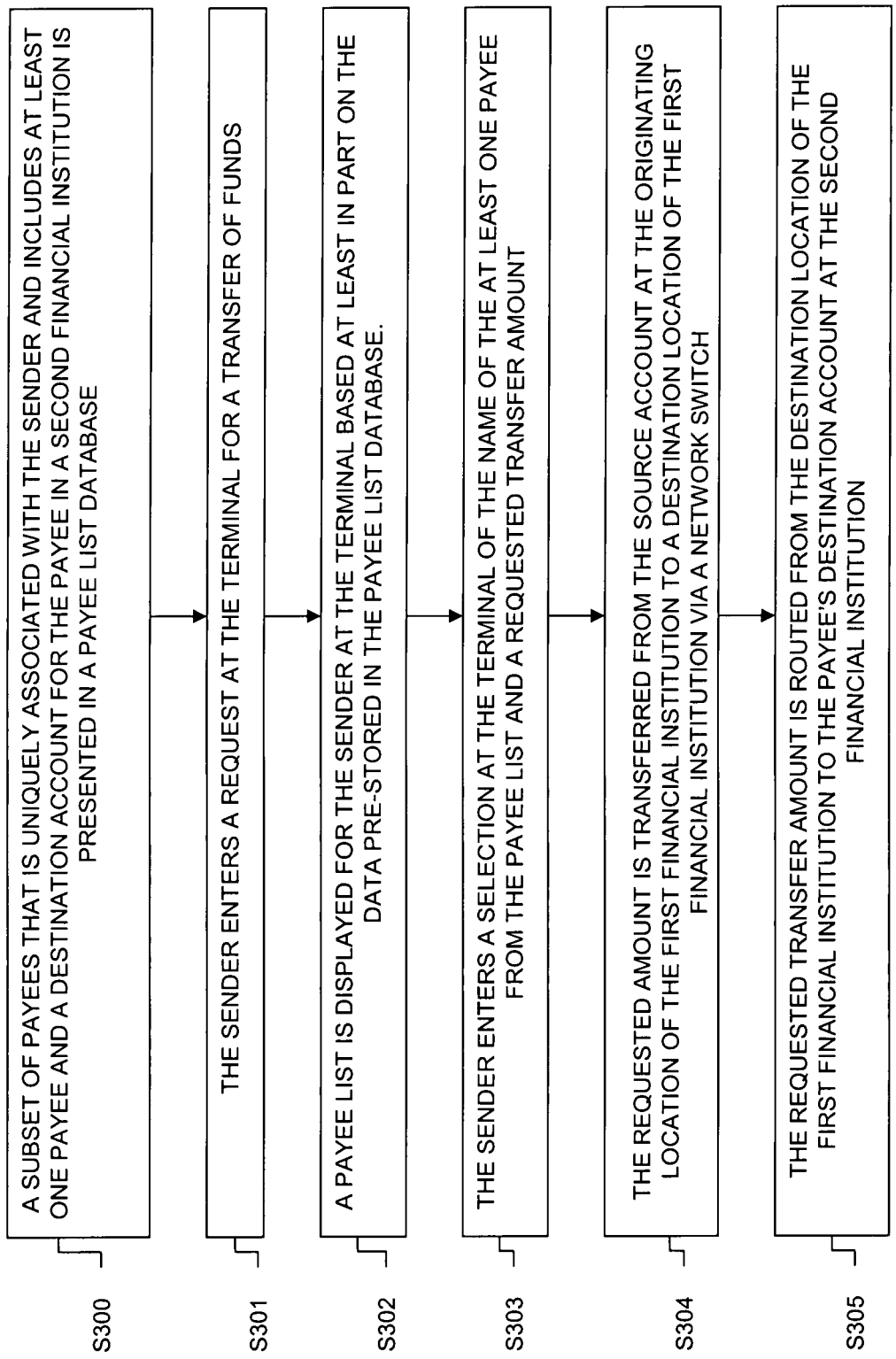

METHOD AND SYSTEM FOR TRANSFERRING FUNDS FROM AN ACCOUNT TO AN INDIVIDUAL

PRIORITY APPLICATION

This application is a continuation-in-part of co-pending U.S. patent application Ser. No. 09/378,961 entitled "METHOD AND SYSTEM FOR TRANSFERRING FUNDS FROM AN ACCOUNT TO AN INDIVIDUAL" filed Aug. 23, 1999, which is a continuation of U.S. patent application Ser. No. 08/877,203 entitled "METHOD AND SYSTEM FOR TRANSFERRING FUNDS FROM AN ACCOUNT TO AN INDIVIDUAL" filed Jun. 17, 1997 (now U.S. Pat. No. 5,963,647 issued Oct. 5, 1999), which claims priority to U.S. Provisional Application No. 60/040,298 filed Feb. 14, 1997, each of which is incorporated herein by this reference.

CROSS-REFERENCE TO RELATED APPLICATIONS

This application relates to Ser. No. 08/795,355, entitled, "A CUSTOMER-DIRECTED, AUTOMATED SYSTEM FOR TRANSFERRING FUNDS BETWEEN ACCOUNTS USING A HOLDING ACCOUNT AND LOCAL PROCESSING," filed Feb. 4, 1995, which is a continuation-in-part of application Ser. No. 08/505,886, entitled, "A CUSTOMER-DIRECTED, AUTOMATED SYSTEM FOR TRANSFERRING FUNDS BETWEEN ACCOUNTS," filed Jul. 24, 1995. The respective disclosures of both Ser. No. 08/795,355 and 08/505,886 are hereby incorporated by reference.

FIELD OF THE INVENTION

This invention relates to a system and method for transferring funds to an individual. More particularly, the present invention relates to a system and method for transferring funds by assigning a password to funds to be transferred to a recipient so that the recipient can subsequently access the funds, for example through an automated teller machine or financial institution, by using the password. Additionally, the present invention relates to systems and methods for transferring funds from a sender's financial institution utilizing a payee list and routing the transferred funds to the payee's destination account in a different financial institution in the same or a different country and allowing the payee to access the transferred funds in various ways.

BACKGROUND OF THE INVENTION

Within the financial service industry, recent times have witnessed expansive growth in customer-initiated account and cash access and payment systems. Perhaps most significantly, the prevalence of networks of automated teller machines (ATMs) has provided individuals with convenient, twenty-four hour a day access for such transactions as cash withdrawal and bill payment. Since the ATM networks of many financial institutions are interconnected, customers typically can perform transactions using the ATMs of other financial institutions in addition to those of their own local financial institution.

The widespread adoption of ATM networks has profoundly benefited consumers as they travel within areas serviced by such networks. Instead of having to plan ahead to have sufficient cash for extended trips, many consumers now carry less cash, confident in the ability to access cash through ATMs located at their destination. Thus, for example, a business person from New York who finds that his or her stay in Chicago has been extended unexpectedly can easily obtain additional cash through the ATM network even if there is no local affiliate of the business person's home financial institution.

Despite these benefits, there are many situations in which existing ATM networks are insufficient to meet the demands of the modern traveler. For example, international travel is increasingly common today. However, primarily because of the use of different currencies and disparities in controlling regulations promulgated by different governmental entities, international travelers typically are unable to expect that they will be able to access cash in an international destination. As a result, international travelers often are forced to carry a significant amount of cash or travelers checks in order to ensure that they will have significant funds for their trip. The traveler must either have exchanged their home currency for the destination currency in advance, or during their trip make exchanges.

Further, notwithstanding the conveniences afforded by ATM networks, a significant number of consumers still do not have accounts which are accessible with an ATM card. For such consumers, even domestic trips outside the areas serviced by their home financial institution require that they carry enough cash for the duration of their trip.

As most people are all too familiar, such travelers often may find themselves in great distress when their cash is lost or stolen. In such circumstances, a traveler must obtain cash, for example by relying on a friend or family member to send money.

A typical way for this to happen is for the sender to "wire" the funds to the traveler. This process requires the sender to contact a financial institution and request that funds be transferred to a specific destination where the recipient is ready to receive the funds. For example, the recipient must locate a local office which is open and wait for the funds to arrive. Needless to say, many emergencies arise outside of normal business hours, and this manner of receiving funds often proves extremely inconvenient for both the sender and the recipient.

The situation may be much worse if no one is available to assist the traveler in distress. In such a case, the traveler often must locate a financial institution which is capable of receiving funds transferred from the traveler's home financial institution. The traveler often must provide identification information which is entered and then transmitted so that it may be authenticated and approved by the customer's home financial institution. This process creates several opportunities for errors to occur which may result in a delay in the customer's request. Should errors occur, manual intervention and investigation then becomes necessary. Again, such transfers are often much more complicated and burdensome where funds must be transferred across international borders.

U.S. patent application Ser. No. 08/505,886 (hereinafter "the '886 application") (now U.S. Pat. No. 5,659,165 issued Aug. 19, 1997) and U.S. patent application Ser. No. 08/795,355 (hereinafter "the '355 application") (now U.S. Pat. No. 5,825,003 issued Oct. 20, 1998) address some of these problems by extending the capabilities of an ATM network. The '886 application describes a system and method that allows funds to be transferred from accounts between related financial institutions (for example, a first bank in the U.S. and an affiliated bank in Germany) or between accounts of two customers within the same financial institution. The method and system of the '355 application further allows funds to be transferred from a first account to an external account serviced by another, unrelated financial institution (for example, from a customers account with a first bank in the U.S. to another customer's account with an unaffiliated bank in Germany). Both systems permit one to transfer funds across international borders in different currencies. Thus, through a global network operated by a common financial institution, a customer spending time in France can transfer funds from an account in New York to a second account in France. The customer in France can also transfer funds to other accounts, even those with other financial institutions in other countries. For example, the customer may transfer funds in German currency to another's account with a Bank B in Germany. Such transactions can be accomplished substantially in real time (excluding time for settlement).

Notwithstanding the advantages provided with the systems described in the '886 application and the '355 application, a great number of travelers do not possess accounts with a financial institution that has a large, international network of ATMs. As a result, such travelers must resort to carrying a large amount of cash, thereby facing the risks described above.

It is noted that others have attempted to address some of the situations noted above. As a general matter, the proposed solutions are generally limited to the transfer of funds within the borders of a common governmental entity, and therefore do not address the complications that arise with the necessary exchange of currency and compliance with import/export regulations and other regulations on financial transactions. Further, many of the proposed solutions require a recipient to locate an office which is open and which is capable of receiving transfers, or, alternatively, have a card or equivalent means which permits the recipient to access an ATM or equivalent terminal.

It is known that EDS has advertised a funds transfer service referred to as "Z Cash." According to EDS, this service is available through ATM networks which support the service. A sender must first locate an ATM which supports the service and access the service, typically by inserting an ATM card or other card which initiates the ATM's services. The sender is prompted to input the amount to be sent and a numerical code. Funds are immediately debited from the senders account or from a credit card account. Once the request is made, a receipt is printed that includes a system-generated security code. The sender then contacts the recipient (for example, by telephone) to indicate that the funds are available and to provide the information necessary for the recipient to receive the funds (i.e., the necessary security code). The recipient must then locate a participating ATM which supports the service and access the funds that were previously withdrawn from the sender's account.

Additionally, U.S. Pat. No. 5,350,906 to Brody et al. and U.S. Pat. No. 5,326,960 to Tannenbaum also describe a funds transfer system which relies, at least in part, on an ATM network. A recipient accesses funds that have been previously withdrawn from the sender's account using a temporary ATM card and an identification number.

SUMMARY OF THE INVENTION

It is an object of the invention to address the shortcomings and limitations of the prior art through a method and system which provides more convenient funds transfer. More particularly, it is an object of the invention to provide a system and method which supports funds transfers from a source account to a cash access file for cardless withdrawal by both customers and non-customers of a particular financial institution. It is a further object of the invention to provide a system and method by which such transfers may take place across international borders so as to provide quick and convenient access to funds, twenty-four hours a day, seven days a week. It is an additional object of the invention to ensure that funds transfers are made in a secure environment and in compliance with applicable regulations.

It is a further feature and advantage of the invention to provide methods and systems for transferring funds from a sender's financial institution utilizing a payee list. It is a still further feature and advantage of the invention to provide methods and systems for transferring funds from the sender's financial institution, for example, in the sender's home country and routing the transferred funds to the payee's destination account in a different financial institution in the same or a foreign country and allowing the payee to access the transferred funds in various ways.

In accordance with the invention, there is a system and method for transferring funds. The invention supports funds transfers from a source account to a cash access file which can be accessed virtually twenty-four hours a day by both customers and non-customers. Access is achieved by the recipient entering a codeword selected by the sender, along with a transaction code randomly generated by the system. Once the sender provides the codeword and the transaction code to the recipient, the recipient can receive transferred cash through an ATM, even without using a card to access the system. With the invention, cash may be transferred across international borders and dispensed in a currency different than that of the sender's source account. Although cash is made available to a recipient virtually as soon as the requested transfer is approved and confirmed by the sender, the sender's account is not debited until the cash is actually received by the recipient.

Further aspects of the invention propose methods and systems for transferring funds for a sender from a source account over a computer network that involve, for example, selecting data from a payee list database coupled to a network switch. A payee list is displayed for the sender at a terminal based, for example, on data pre-stored in the payee list database in response to entry of a request by the sender at the terminal for a transfer of funds.

In such further aspects, upon receiving entry of the sender's selection at the terminal of the name of the a payee from the payee list and a requested transfer amount, the requested amount is transferred from the source account at the originating location of the first financial institution (e.g., the sender's bank in the sender's home country) to a destination location of the first financial institution (e.g., a branch of the sender's bank in a different country) via a network switch and then routed from the destination location of the first financial institution to the payee's destination account at the second financial institution (e.g., the payee's bank in the country in which the branch of the sender's bank is located).

According to such further aspects, the data pre-stored in the payee list database might also include, for example, a transfer method, a transfer currency, a last transfer amount, a last transfer reference number, a last transfer secret code, a recipient business, and a third party. Pre-storing the data can be accomplished, for example, by entry of the data by the sender during an online banking session with a home banking server of the first financial institution or the data may be received from the sender in person at a branch of the first financial institution. In any event, the payee list database is accessible only by customers and employees of the first financial institution. The terminal at which the payee list is displayed for the sender can be, for example, a self-service financial transaction terminal of the first financial institution or a computing device serving as an on-line banking terminal. Further, the payee list is displayed for the sender at the terminal, for example, via the network switch, which also displays currency exchange rate information for the sender at the terminal.

The requested amount is transferred from the source account at the originating location of the first financial institution in a first country (e.g., the sender's bank in the sender's home country) to the destination location of the first financial institution in a second country (e.g., a branch of the sender's bank in a different country) via the network switch and routed to the payee's destination account at the second financial institution (e.g., the payees bank in the country where the branch of the sender's bank is located), for example, via a destination location clearing house network (e.g., a clearing house in the country where the branch of the sender's bank and the payee's bank are both located) or via a financial messaging system, such as SWIFT. Thereafter, the payee is allowed to access the transferred amount in the payee's destination account, for example, by withdrawing the transferred amount from the payee's destination account at a branch of the second financial institution or via a withdrawal at an ATM of the second financial institution These and other objects, features and advantages of the invention will be better understood from the ensuing description of exemplary preferred embodiments of the invention.

BRIEF DESCRIPTION OF THE DRAWINGS

In the drawings:

FIGS. 5A to 5C are flow charts illustrating a method of requesting a funds transfer using a customer activated terminal.

FIG. 7 is a table that illustrates examples of data contained in the payee list for embodiments of the invention.

FIG. 10 is a flow chart that illustrates an example of the process of transferring funds utilizing the payee list and routing the transferred funds to the payee's destination account for embodiments of the invention.

DETAILED DESCRIPTION OF THE PREFERRED EMBODIMENTS

The following description, made in reference to the drawings, illustrates a preferred system and method in accordance with the invention.
System Architecture It is an advantage of the invention that it can be implemented in conjunction with existing system architecture. This permits the invention to be utilized in conjunction with ubiquitous ATM networks that provide twenty-four hour a day user access throughout much of the world. Further, it allows the invention to be implemented more easily through upgrades of existing architecture. Moreover, the invention may be offered in conjunction with other financial products and services, for example, those described in detail in the above-noted '886 application and '355 application so as to provide a variety of ways of transferring funds.

While many of the features of the invention could be adapted for use with conventional ATMs, in the preferred embodiment a special type of ATMs, referred to herein as Customer Activated Terminals (CATs), comprise the principle user terminal for customer access to the invention. As known in the art, a CAT is a particular type of ATM produced by, or on behalf of the assignee of the present invention. Unlike many other ATMs which function primarily or solely as cash dispensing machines, CATs provide access to a range of financial products and services. These include "basic" services such as cash withdrawals, fund deposits, bill payments, fund transfers, balance inquiries, transaction histories, etc. Additionally, CATs support other services, such as brokerage functions.

Figure 1:
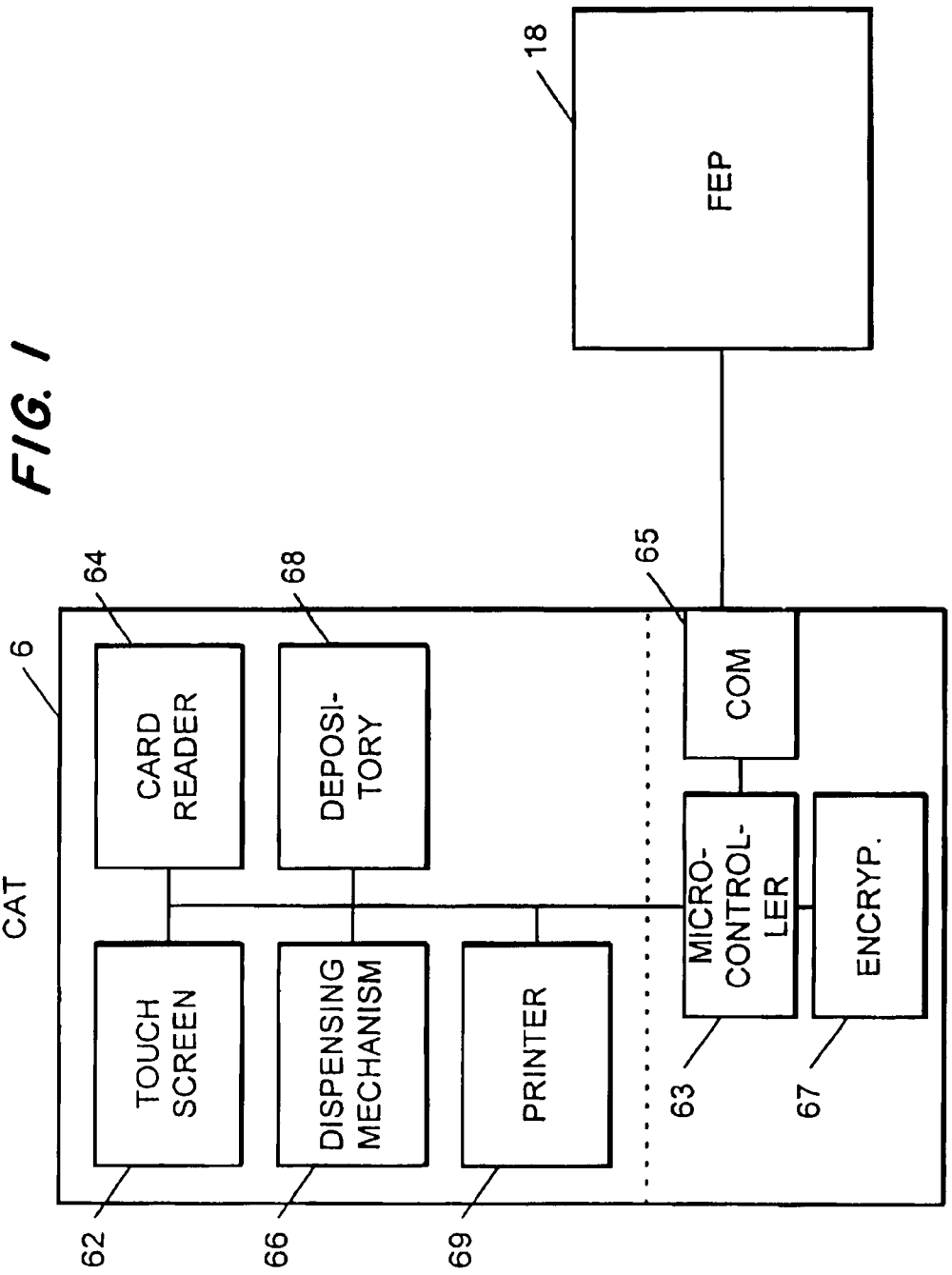
FIG. 1 is a block diagram of a standard customer activated terminal (CAT).

FIG. 1 illustrates some of the features of a standard CAT 6. Structures which generally correspond to those found in a conventional ATM include: a dip-type magnetic card reader 64 for accepting deposit and payment envelopes, a cash dispensing mechanism 66, and a printer 69. The CAT 6 also includes more advanced structures, such as a dynamic touch screen 62 that utilizes color graphics. This interface is more versatile than many other ATMs in that it is readily reconfigurable to accommodate newly developed functionality. It further provides an interactive display in which buttons and keys are replaced with images of familiar-three-dimensional objects, such as a keyboard.

The internal components of the CAT 6 include a microcontroller 63 and a communication device 65 for communication with a front end host system 18. As known in the art, a principle function of the microcontroller 63 is to control the display of information from the front end 18 and to convey the information input by the user with the card reader 64 and touch screen 62. The microcontroller also executes software that controls the operation of dispensing mechanism 66, the depository 68, and the printer 69.

As described in greater detail below, it is a feature of the invention that a sender who requests a funds transfer assigns a secret code or password for the receiver to use to access the funds. In order to maintain security, this password is encrypted locally at the CAT 6 before being sent to the front end system 18 in accordance with well known techniques. This function is generally illustrated in FIG. 1 by block 67.

Figure 2:
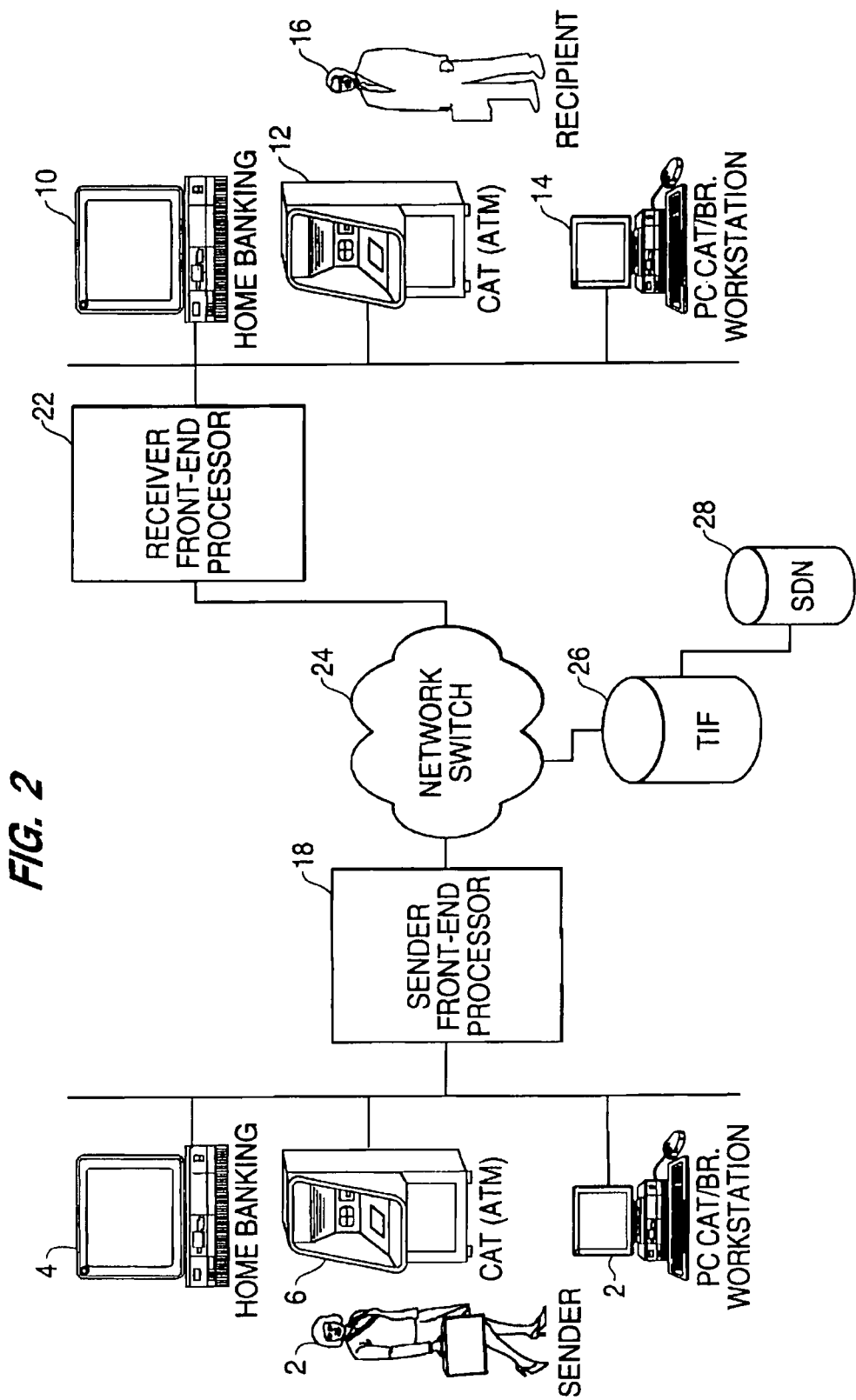
FIG. 2 is a block diagram of a system according to the invention.

FIG. 2 is a block diagram of a system 1 according to the invention. The system comprises a variety of access points comprising different terminals by which a sender 2 or a recipient 16 can access the system. For example, a sender 2 may access the system with a CAT 6 as described above in reference to FIG. 1, or an equivalent ATM. Alternatively, they system may be accessed through a personal computer (PC) serving as a home banking terminal 4. Additionally, a user terminal may comprise a PC or workstation 8 located within a secure branch site that is configured to operate as a CAT (referred to herein as a PCCAT).

It will be understood that other types of terminals also may be utilized in conjunction with the invention. For example, it is known to utilize a telephone to input information pertaining to a financial transaction using "tone" or dual tone multiple frequency (DTMF) signals. Other suitable terminals will be apparent to those skilled in the art. Moreover, it will be appreciated that transactions may be requested and funds received through branch offices instead of through the self-service terminals referred to above. Of course, it is anticipated that even assisted transactions made through a branch would ultimately be input to the system 1 so that the transferred funds would be available to the recipient through the system 1.

In the system 1, the various sender terminals 4, 6, and 8 and recipient terminals 10, 12, and 14 communicate with respective front-end processor (FEP) systems 18 and 22. As known in the art, an FEP typically is maintained by a particular financial institution, such as a local bank. The FEP provides service provider information and network control data to the terminals connected thereto. Conventionally, data is exchanged in a message format consisting of a request from the user terminal and a response from the FEP. Although only a sender FEP 18 and a recipient FEP 22 are shown, several FEPs are utilized to support thousands of user terminals connected together. The elements communicate in a manner known in the art through a communications network referred to generally as network switch 24.

In accordance with the invention, fund transfers are implemented with a Transfer Initiation File (TIF) 26 which is maintained by the system. As described below in greater detail, the TIF serves as a vehicle through which a self-withdrawal may be made by any recipient 16, whether or not the recipient is a customer of the sender's financial institution. According to one feature of the invention, the recipient may access funds through a CAT even without having a card (debit or credit card) as conventionally required.

The system according to the invention further maintains and utilizes a centralized Special Designation Nationals (SDN) file 28. This file is used by the system to validate requested transfers so as to comply with various laws and regulations, such as OFAC regulations.

System Operation

Figure 3:
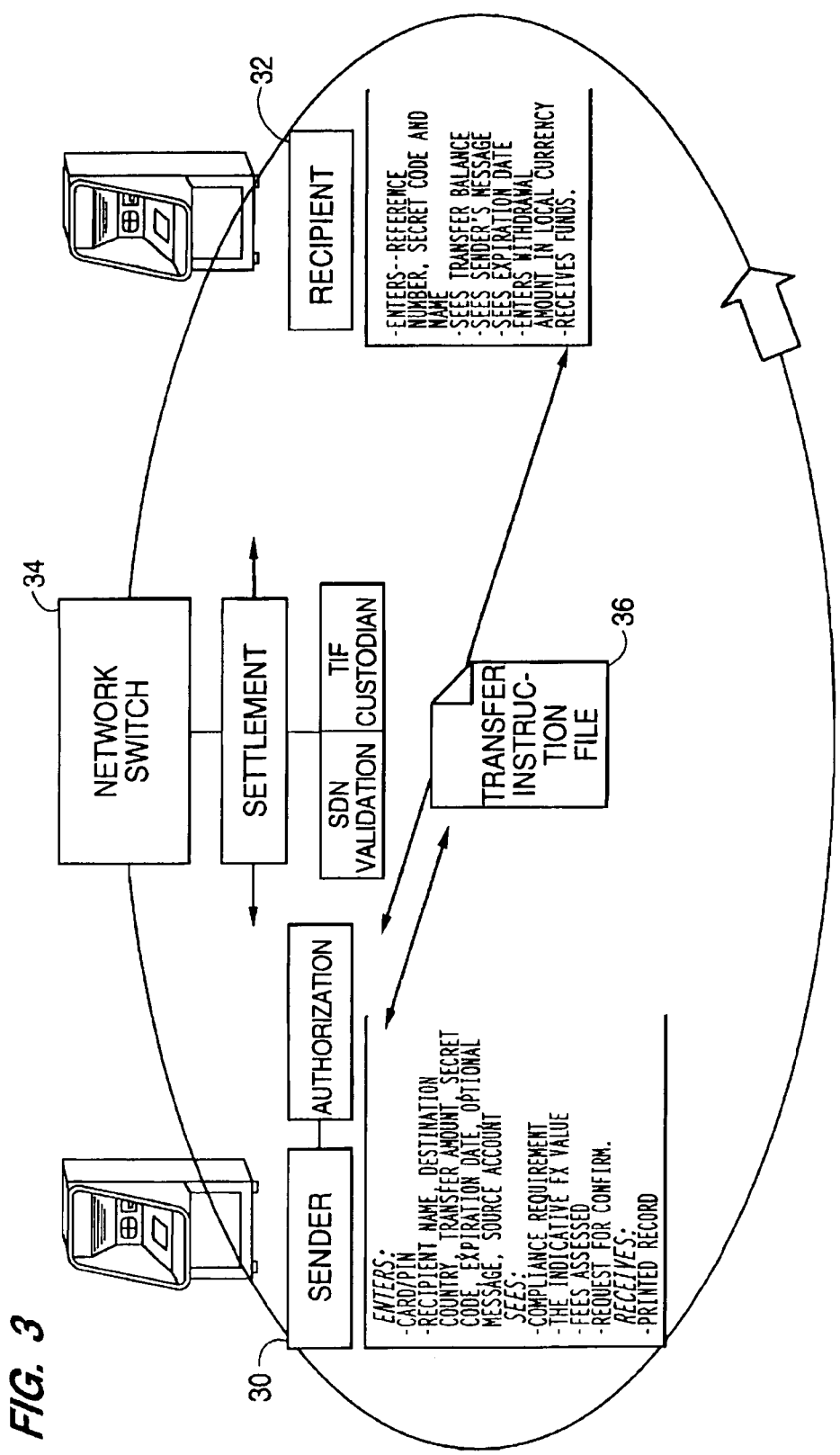
FIG. 3 is a block diagram illustrating the interaction among a teacher terminal, a network switch and a recipient terminal in a system according to the invention.

FIG. 3 is a block diagram which provides an overview of the general functionality and interaction of three system components: (1) a sender terminal 32; (2) a network switch 34; (3) and a recipient terminal 32. It will be understood that the communication among these components are achieved in conjunction with the architecture shown generally in FIG. 2. Transfer protocols which may be utilized to exchange messages between each component are generally known in the art, and therefore are described merely by reference.

The sender enters a personal identification number (PIN) which is used along with information read from magnetically encoded information on the sender's card to authenticate the sender's request. The sender further enters information used to process the requested transfer, including: the sender's name, a secret code (preferably a number at least six characters in length which is entered twice to ensure accuracy); the transaction amount (as permitted subject to legal, currency and denomination restriction); the recipient's name; the address of the recipient; an optional message to the recipient; the destination country where the funds will be received; and the source account which is debited to cover the requested transfer amount and any associated fees. For simplicity, it may be desired to limit a sender to being able to select only a default currency corresponding to the destination country in multiples of the smallest denominations supported by the network in the destination country. For example, if the sender wishes to transfer funds to Germany, the sender may limit the possible request amounts to multiples of ten deutche marks (ten euros after changeover).

With the sender terminal, the system displays to the sender: global compliance requirements; any transfer limitations to the destination; any limitations on access to the funds in the destination country; the information entered by the customer; the transfer amount in the currency to be dispensed to the recipient; the equivalent transfer amount in the currency of the sender's account; the recipient's name; the destination country; and any fees to be applied. The sender terminal further displays a message requesting the sender to confirm the transaction.

If the sender approves the transaction as displayed to the sender, the system provides a transfer confirmation reference number and displays the transaction amount in the destination currency. Transaction fees are deducted from the source account at this time, and the resulting source balance is displayed to the sender The funds are then logged by the system to the TIF 36 and the SDN is checked to comply with applicable regulations, such as international anti-terrorism identity checks and country specific regulations. Although not shown, it is preferred that the sender's FEP perform a fraud/MIS analysis to ensure transaction integrity.

Once the requested transaction has been confirmed and logged, the sender terminal prints a record of the transaction. This record shows the following: terminal ID, date and time; the transfer authorization amount in the destination currency; any transaction fee applied by the network; the transfer confirmation reference number; the recipient's name; and the balance of the source account.

It is preferable that the terminal block the transaction if the printer is inoperative at the time the transaction is requested and provide an explanatory message to the requester. If the printer becomes inoperative after the transaction has been processed, then the transaction should be reversed and an appropriate explanatory message provided to the sender.

Once the transfer is requested and approved in this manner, the sender must then contact the transfer recipient (for example, by telephone) and provide the following information: the secret code selected by the sender at the time the transfer was requested; the amount of the transfer; the transfer confirmation reference number generated by the system at the time the transfer was requested (and printed on the sender's receipt); and the expiration date of the transfer. While only the first three pieces of information must be entered to receive the cash, the expiration date should be conveyed to the recipient so that the recipient is cognizant of the time limit that is in place.

As with the sender, it is a feature of the invention that the recipient may access the system with respect to the transaction through a variety of means, including through a self-service terminal with no requirement that the recipient even have a card to access the terminal. For example, self-service withdrawals may be made by a recipient using a terminal, such as a CAT, configured to present a user with the option to receive a cash transfer without requiring authentication in the conventional manner (i.e., with a card and PIN). In this manner, even non-customers may receive funds.

As illustrated in FIG. 3, a recipient uses a CAT to enter the reference number and secret code which were provided to the recipient by the sender, along with the recipient's name. Once this information is confirmed by the network, the recipient terminal displays the transfer balance, the expiration date and any optional message from the sender. It is a feature of the invention that the recipient may withdraw the entire amount of the transfer or a partial amount. Accordingly, the system prompts the user to input the amount to be received. Once this amount is entered (and, of course, assuming that the transaction has been authenticated), the requested amount is dispensed to the recipient in the currency of the country in which the recipient is located.

Settlement

As illustrated in FIG. 3, in addition to calculating foreign exchange (FX) rates and maintaining the SDN file and TIF, the network switch performs a settlement process among the financial institutions associated with the transaction. For example, if the sender requests a transfer at a CAT serviced by a bank in New York to a recipient in France, once the recipient withdraws funds in France (in francs) (in euros after changeover), the network switch handles settlement for reimbursing the bank in France from which the funds were disbursed to the recipient.

It is a feature of the invention that settlement does not take place until the funds are actually withdrawn by the recipient. As a result, the source account is debited via electronic funds transfer (EFT) only once funds have been received by the recipient. Moreover, in cases where the destination currency differs from the currency of the source account, foreign exchange settlement also occurs only after the destination funds have been withdrawn. Thus, transfers made in accordance with the invention may be understood functionally as an "electronic check" where the sender remains the "owner" of the funds until they are picked up by the recipient. Any funds not accessed by the recipient remain in the sender's account until the requested transfer expires. Although requested funds remain in the account until settlement, it is preferable that fees associated with the transaction be immediately debited from the sender's source account once the transaction has been confirmed and approved.

Cancellation

It is an additional feature of the invention that the sender may cancel a pending transaction in the TIF at any time before the funds have been retrieved. In the case where partial funds have been received but some funds remain, the remaining funds will not be available to the receiver.

In order to cancel a transfer, the sender may access the system through any of the access points as described above. For self-service transactions, for example, using a CAT, the sender must identify himself with a card and PIN. Once the identity of the sender is established in this manner, the sender enters the reference number for the transfer and a request that it be canceled. In the event that the reference number has been forgotten, it is preferable to provide the recipient with the option of looking the reference number up through the system, for example, using a transaction journal entry as described below.

If a recipient attempts to access funds from a canceled transaction, the recipient will be informed, for example, through a message displayed on the screen of a CAT, that the sender canceled the transaction. In order to support this notification feature, cancellation notifications in the TIF should be held for the normal expiration period.

Transaction Status and History

Optionally, the system according to the invention may support status inquiries and transaction history requests by which the sender can inquire the status of a transfer. Status inquiries may be used to allow the sender to check the status of requested transfers using the reference number of the transaction. Thus, the sender may determine if any funds remain in the total amount transferred to the recipient.

Additionally, the system may support sender review of a transaction journal (TJ), that is, a history of recent transactions, including funds transfers made in accordance with the invention. Preferably, the information displayed to the sender as part of the transaction journal would comprise: the transaction date, time and terminal ID; the dispense transaction amount and currency code; the equivalent source transaction amount and currency code; the transaction reference number; and a transaction description (withdrawal, fee or canceled by sender).

Transfer Instruction File

As indicated generally in FIGS. 2 and 3, the system according to the preferred embodiment maintains information pertaining to a requested transaction through a TIF. The TIF is an important feature of the invention, supporting the invention's ability to effect transfers to both customers and non-customers in a convenient, secure manner. The TIF further supports the delayed settlement, cancellation, and transaction status and history features described above. It also provides a means to designate funds requested for transfer, while maintaining the sender's ownership of the funds until the recipient receives the funds and the sender's account is debited.

Figure 4:
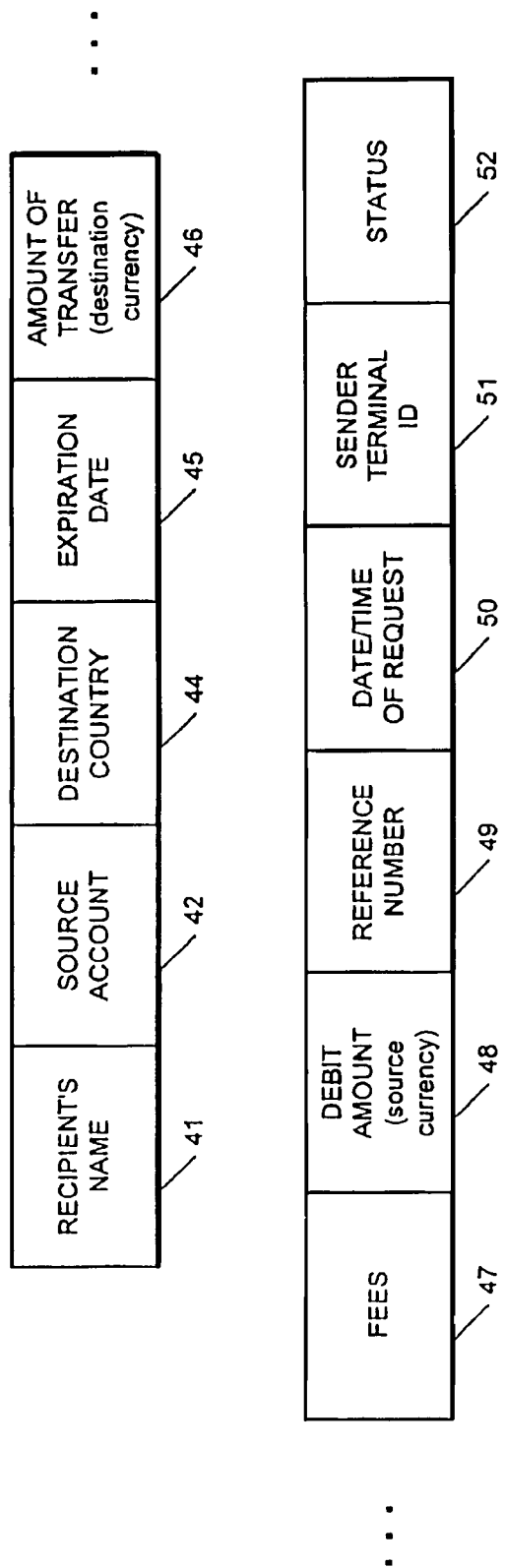
FIG. 4 is an illustration of the information regarding a transfer made in accordance with the invention as stored as an entry in a Transfer Instruction File.

FIG. 4 generally illustrates a TIF entry 40 corresponding to a particular transaction. The entry comprises several data elements corresponding to a transaction. These include information entered by the sender: the recipient's name 41, the source account selected by the sender 42; the destination country 44; and the expiration date of the transfer 45. The TIF entry also includes the amount of currency to be made available to the recipient at the destination location 46, any fees associated with the transaction 47, and the amount debited (or to be debited) from the sender's source account 48. The system also uses the TIF entry to maintain other information regarding the transaction, such as: the reference number automatically generated by the system (and provided to the sender) 49, the date and time of the sender's request 50; the terminal where the request was made 51, and the status of the funds 52. The status information 52 may include, for example, the date and time that any funds were accessed, the amount of any funds which remain available to the recipient, and the date and time of any request by the sender to cancel the transfer. The amount of any funds withdrawn by the customer is also maintained by the system. Of course, additional information may be included in the TIF.

It will be appreciated that the TIF provides a means by which the network can maintain a record of all transfers at a central location, thus facilitating processing of transactions which involve different currencies and different (but perhaps affiliated) financial institutions. The TIF further provides a convenient log for maintaining the funds until expiration or cancellation of the requested transfer. It also facilitates fraud detection and auditing.

Foreign Exchange

As referred to generally in FIG. 3, fund transfers made in accordance with the invention may involve two different currencies. In order to process such requests, it is necessary for the network switch to receive current foreign exchange rates for calculating currency conversion at the time of settlement. In the preferred embodiment, current foreign exchange rates are maintained by a separate component system of the network switch. This system operates in accordance with known principles to provide data elements corresponding to exchange rates to the processor which calculates the amount to be debited from the sender's account at settlement. These data elements are updated on a business date basis.

Security and Regulatory Compliance

It will be appreciated by those skilled in the art that the system and method of the invention requires an extensive data and message security review and support infrastructure to ensure that all legal, regulatory and fraud-related issues are in compliance. The invention addresses this concern in part with the above-mentioned Special Designated National (SDN) file. This file is a compilation of information used for anti-terrorism and compliance with OFAT regulations regarding transfers. For example, information pertaining to the transaction, such as the recipient's name and address is matched against information stored in the SDN file. Moreover, requested destination countries are cross-referenced to access information stored within the SDN file corresponding to country specific limitations on transactions. Such limitations may include limits on transaction amounts, restrictions on wire transfers, or restrictions on self-service withdrawals (for example, cross-border withdrawals may be limited to branches only). This information from the SDN is applied at the time a request is made to ensure that it is in compliance with the regulations of specific jurisdictions.

In addition to complying with legal requirements, the invention addresses other security concerns. Each access point referred to in FIG. 2 includes resident processes to encrypt the authentication code used for each transaction. To protect against discovery of the authentication code chosen by sender, the system requires that it differ from the sender's PIN. Moreover, transaction reference numbers generated by the system are randomly generated to prevent fraudulent access.

System security may be further enhanced to prevent unauthorized access to funds. In this regard, the system may restrict attempts to access funds to a predefined number. For example, a recipient may be allowed three attempts to input the correct recipient information, including secret code and transfer confirmation reference number. After three incorrect attempts, the system flags the transaction so that it is inaccessible until the next business day. If this happens for three consecutive days, the transfer will be rejected.

Additionally, the invention may incorporate a transaction log file of all withdrawal transactions which can be used to track fraudulent transactions and for auditing. Such a file may include an identification of the terminal and financial institution identification through which the withdrawal took place, the date and time of the withdrawal, the transaction amount and the currency code. This records all activity and can be used to track fraud.

Interface

Now that the features of the invention have been described in reference to FIGS. 1 to 4, exemplary methods of requesting a funds transfers or making a withdrawal of transferred funds are described respectively in reference to FIGS. 5 and 6. In these examples, the principle user interface is preferably a CAT. As noted above, this type of terminal is advantageous in that it is user-friendly, can be easily reconfigured, and supports entry of alphanumeric data with virtual keyboards displayed on a touch screen. Moreover, CATs are easily configured to support user access even without the use of a card and PIN.

The reconfigurability of CATs is particularly advantageous in the context of the invention since it permits the invention to be implemented by modification of existing system architecture. It also permits the features of the invention to be offered in conjunction with other financial products and services, such as those described in the above referenced '355 and '886 applications. Despite these advantages, it will be appreciated that the invention may also be used in connection with other terminals, such as conventional ATMs.

1. Sender Transactions

Figure 5A:
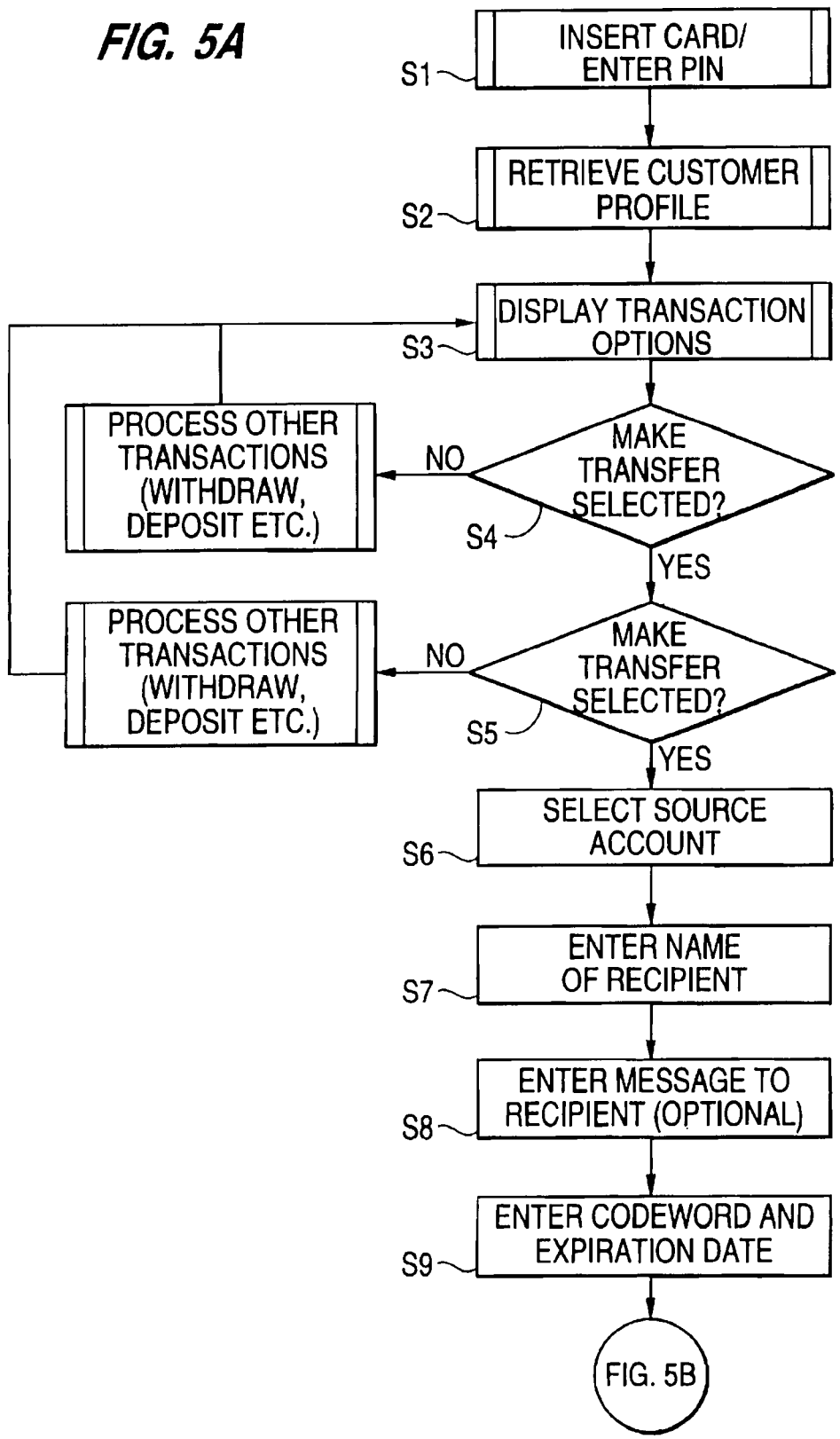
Figure 5C:
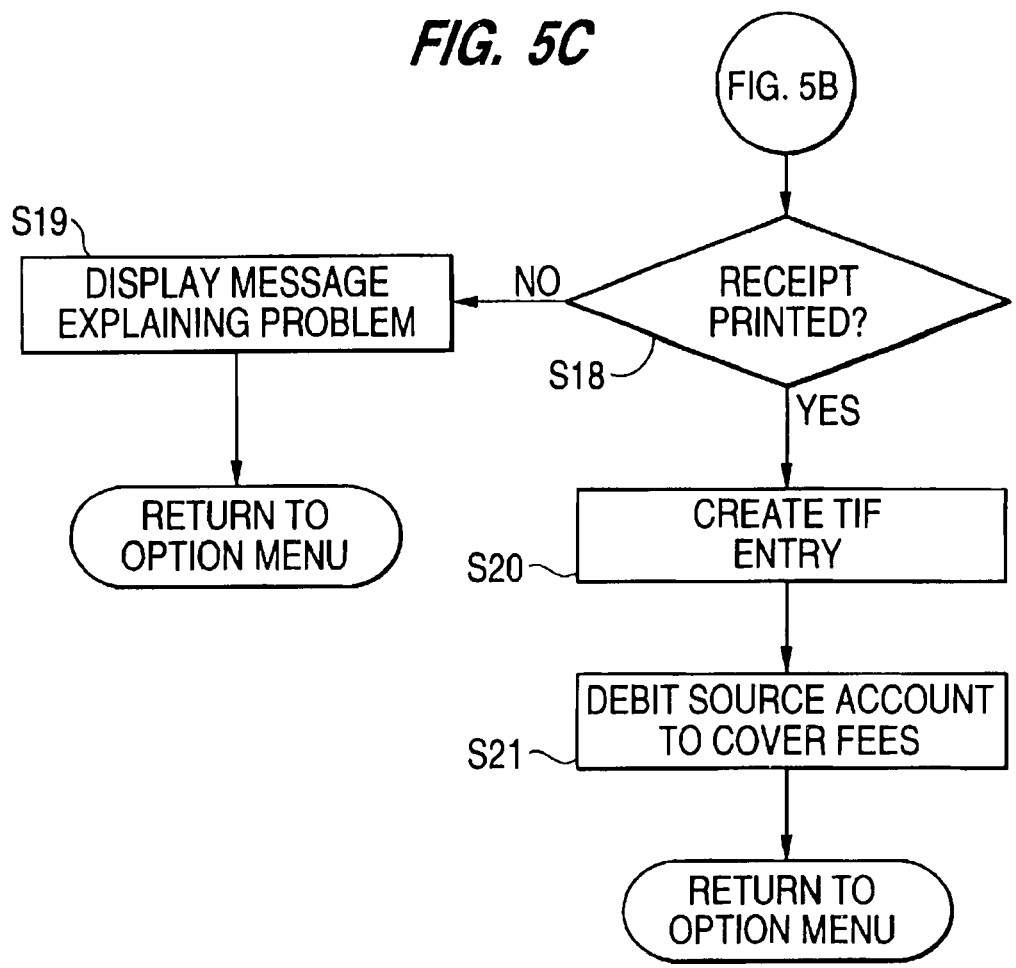

FIGS. 5A to 5C are flow charts which illustrates a process by which a sender requests a fund transfer using a CAT. At S1, a user session is initiated by the sender dipping the sender's card in the card reader and entering the sender's personal identification number (PIN) with the touch screen. Once the PIN and the information read from the magnetic stripe on the sender's card have been forwarded to the FEP, at S2 the FEP responds by providing the cardholder's profile to the CAT. This profile indicates the accounts which the cardholder may access and other information.

Once the sender has input this information to establish authorization to proceed, the CAT presents a variety of options, such as withdraw cash, transfer funds, make payments, get information, etc. For purposes of this discussion, a description of other options is omitted. A full description of other features that can be offered together with the invention through a CAT or other ATM may be found, for example, in the disclosure of the '355 and '886 applications which are hereby incorporated by reference.

In the preferred embodiment of the invention, the selection of "making transfers" results in the sender being presented with a variety of options, including the option of cash transfers made in accordance with the invention. Other options may include transfers made in accordance with the techniques described in the '355 and '866 applications.

Once the user selects the option of making a transfer in accordance with the invention at S5, the terminal prompts the user to select a particular type of source accounts from a list of possible types. Upon selection of the type of source account at S6, the CAT prompts the user to select from a list of the user's own accounts, for example, by displaying the account number and the type of currency associated with it.

Once the user has identified the source account for the transfer at S7, the CAT then prompts the user to enter the name of the intended recipient. For this purpose, the CAT may display a standard keyboard which permits the user to "type" in the name of the recipient. Optionally, the user may be prompted to type in a message to the recipient at S8.

Next, at S9 the user is prompted to select a secret codeword and an expiration date for the transfer. Again, a CAT is advantageous in that it permits the user to use a virtual keyboard so that the codeword may comprise an easily remembered sequence of alphanumeric characters. Of course, a simple numeric sequence could also be used.

At S10, the user is prompted to select the geographical destination of the transfer and the requested transfer amount in some multiple of the lowest denomination available for distribution in the currency of the selected destination country. It will be understood that this step may be performed in a variety of ways. For example, a list of potential destination countries (or other geographic regions) could be stored locally in the CAT along with a table which indicates the smallest denomination available in the currency of a selected destination. Alternatively, this information could be stored in the FEP or the network switch and communicated to the CAT.

Once the user has entered the information described above, it is forwarded to the network switch which calculates the applicable foreign exchange rate for the currency of the source account and the currency of the selected destination at S11. Using this rate, the system calculates the projected amount to be debited from the source account in the currency of the source account. At S12, the network further consults a table to determine the applicable fees and any compliance information that should be displayed to the user.

At S13, the network switch also reviews the requested transaction by comparing some of the information, such as the recipients name with information stored in the SDN file. Based on this check, the network switch may selectively decline or approve the requested transaction. If it is declined, as shown at S14, an explanatory message is displayed by the CAT and the user is provided with the option of selecting other transactions.

If the transaction is approved, the network switch forwards the compliance notices and the foreign exchange amount to the CAT via the FEP.

At S15, the CAT uses the information received from the network switch to provide a recap of the user's request, including all fees and the projected debit to the selected source account. The CAT displays any notices or other information required for compliance with legal requirements. At S16, the user is then asked if the user wishes to proceed with the requested transaction.

If the user indicates that the user does wish to proceed with the requested transaction at S17, the CAT randomly generates an authorization code which is displayed to the user. CAT also attempts to print a record of the transaction for the customer. Preferably, this record includes the terminal ID number of the CAT, the date and time of the transaction, the authorization code, and the amount of the transfer.

The CAT then determines at S18 whether the record has been printed. If not, at S19 the CAT displays a message to the user explaining the problem, and cancels the transaction. If the record is printed, at S20 the CAT forwards the information regarding the requested transfer to the network switch, which in turn creates an entry to the TIF regarding the requested transaction. For example, this entry includes the information shown in FIG. 4. At S21, the fee amount is debited from the selected source amount.

It will be understood that the foregoing is merely one example of a method for requesting a transfer. Those skilled in the art will appreciate that the particular sequence of the steps may be modified without departing from the invention.

2. Receive Cash

Figure 6A:
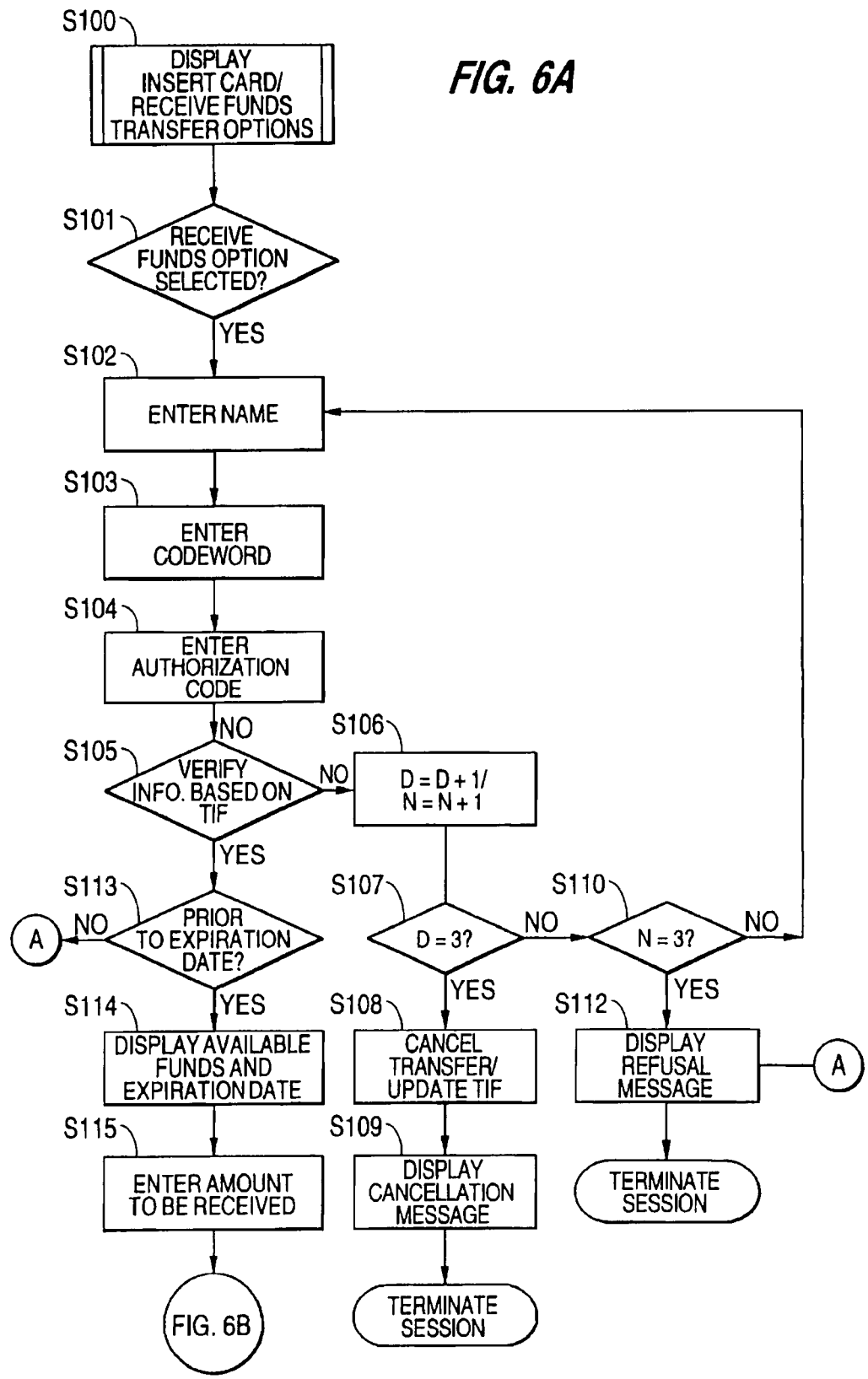
FIGS. 6A and 6B are flow charts illustrating a method of receiving transferred funds using a customer activated terminal.
Figure 6B:
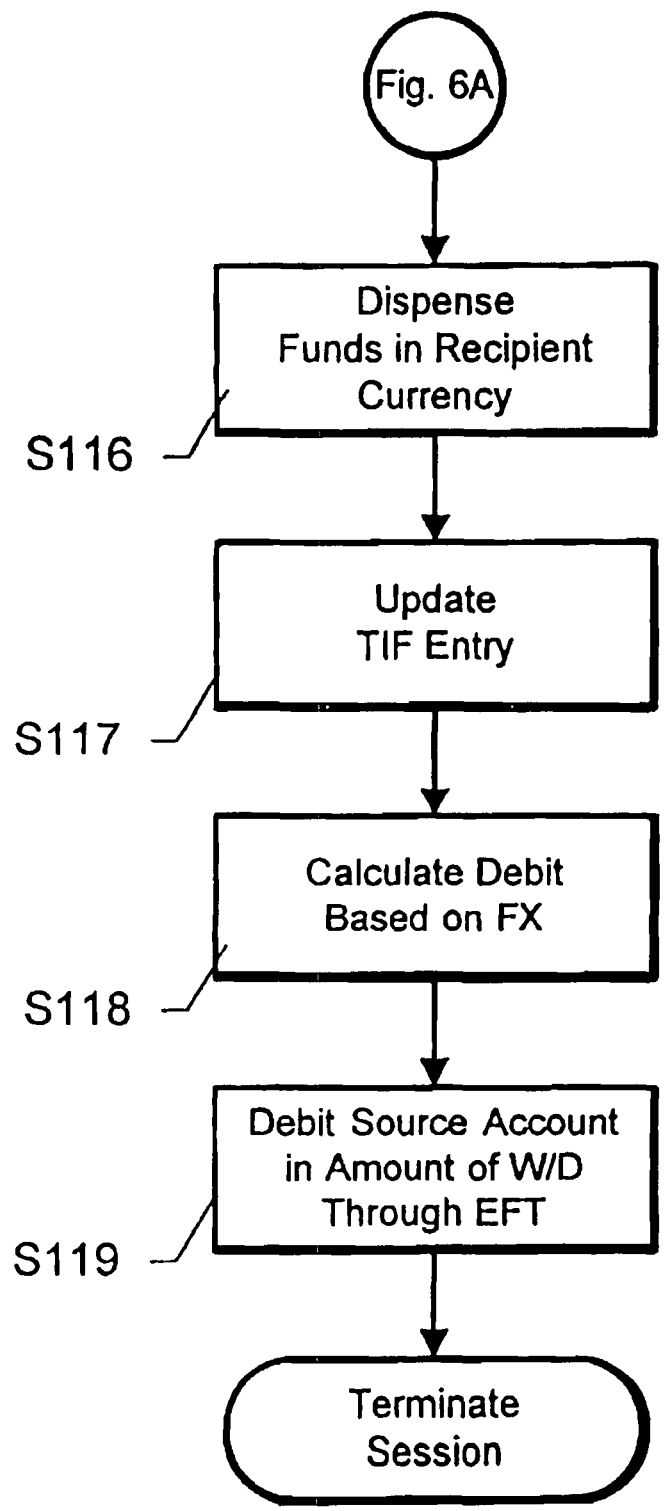

FIGS. 6A and 6B are flow charts illustrating an example of a method by which a recipient may receive transferred funds through a CAT. Again, it is noted that a recipient may also receive funds at a particular destination in other ways, for example, through a branch location.

At S100, a CAT displays a funds transfer option. This permits the user to receive cash without inputting a PIN and card in the conventional manner. At S101, the CAT detects whether the receive funds option is selected. If so, the user is prompted at S102, S103, and S104 to enter the user's name, codeword and authorization code as provided previously by the transferor.

At S105, the information entered by the user is encrypted and communicated to the network to verify that the information matches that stored in the TIF. If the information is incorrect, a count D of the number of days attempted and a count N of the number of attempts is incremented at S106. If (as shown at S107) the user has entered incorrect information three consecutive days, the requested transfer is canceled (i.e., the funds are no longer available), the TIF is updated accordingly (S108), and a cancellation message is displayed (S109). If the number of incorrect attempts N reaches three (S110), a message is displayed indicating that the requested transfer has been refused (S112) and the session is terminated. In such a case, the user may try again the next day, thereby affording authorized users the opportunity to contact the transferor to obtain the correct information.

At S113, the system checks the information from the TIF to determine whether the requested transfer has expired. If not, at S114 the CAT displays the amount of available funds and the expiration date. At S115, the recipient enters the amount to be received. Thus, the recipient can access less than the full amount transferred. The remaining balance may be accessed at a later date so long as it is prior to the expiration date.

At S116, the CAT displays the requested amount in the currency of the destination CAT. The CAT then requests an update to the TIF to reflect the withdrawal (S117). The system calculates the applicable debit amount, based on the applicable foreign exchange at S118. The amount of the withdrawal is debited from the source account S119 in accordance with known techniques. Preferably, the debit is made by electronic funds transfer through the automated clearinghouse procedure of the source country.

Payee List

Further embodiments of the invention include, for example, employment of a predefined payee list for use by customers of the financial institution in transferring funds.

According to such further embodiments, a customer can pre-store his or her payee list, for example, during an online banking session with the financial institution's home banking server or in person at a branch of the financial institution. The payee list for embodiments of the invention is owned, for example, by a global entity which can be associated with, or sponsored by, or in some way affiliated with a global financial institution. The payee list is accessible, for example, by customers and employees of the financial institution, such as staff and investigators of the financial institution.

Embodiments of the invention provide functionality, for example, for selecting a payee from the payee list and selecting a destination for the funds transfer. The functionality for selecting the destination includes a number of options for both customers and non-customers, such as transfer of funds from a local bank to a branch of the same bank in the same or a different country, transfer of funds from the local bank to a different bank in the same of a different country, transfer of funds from the local bank for cash pick up at a branch, or transfer of funds from the local bank for a cardless withdrawal.

FIG. 7 is a table that illustrates examples of data contained in the payee list for embodiments of the invention. Referring to FIG. 7, the data contained in the payee list includes, for example, a source account 100, a sender's name 102, a transfer method 104, and a transfer currency 106. Other data contained in the payee list includes, for example, a recipient business 108, a third party 110 (if applicable), a payee name 112, a destination account 114, a last transfer amount 116, a last reference number 118, and a last secret code 120 (e.g., encrypted)

Figure 8:
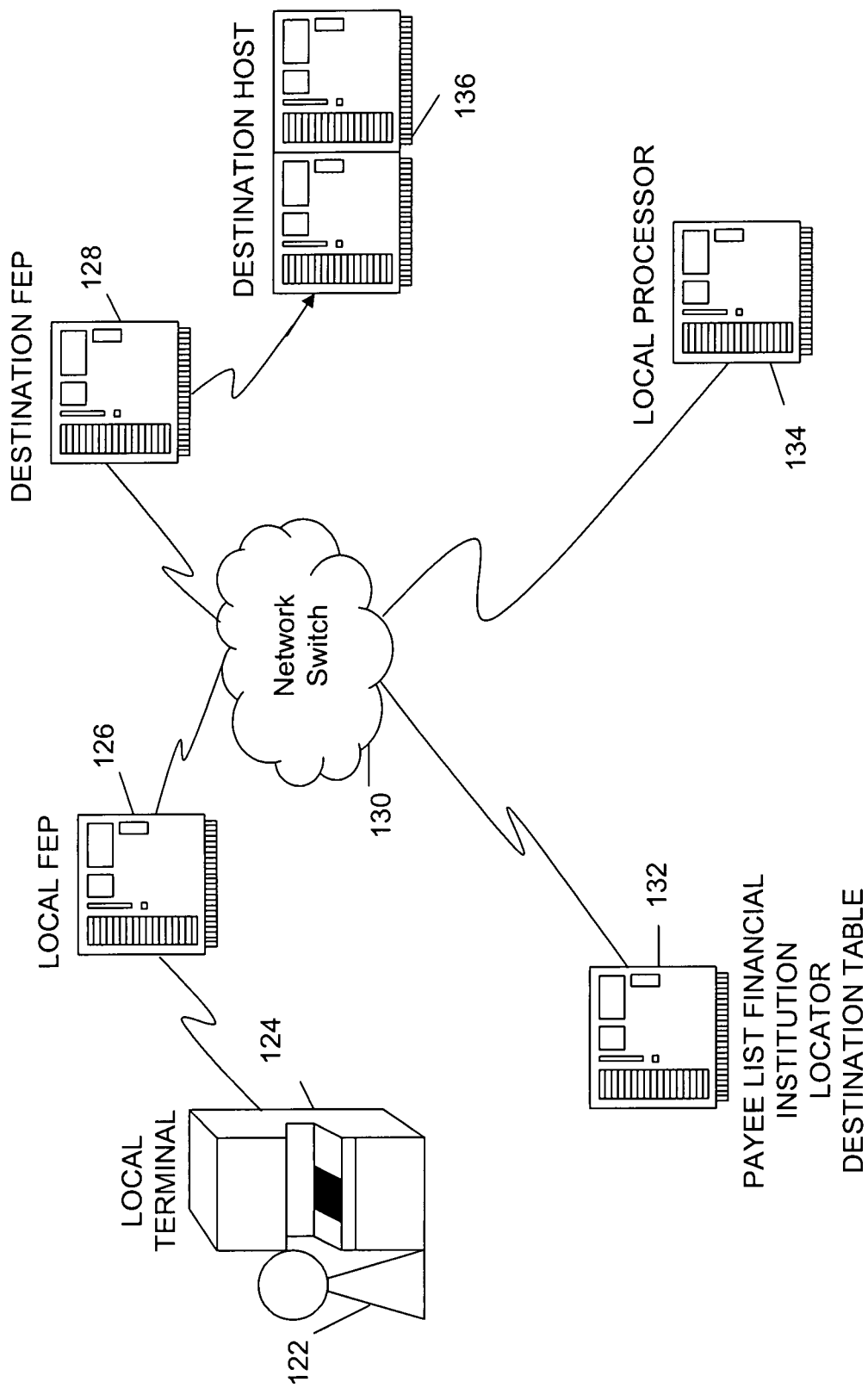
FIG. 8 is a schematic diagram that illustrates an example of key components and the flow of information between key components for a transfer of funds utilizing a payee list for embodiments of the invention.

FIG. 8 is a schematic diagram that illustrates an example of key components and the flow of information between key components for a transfer of funds utilizing a payee list for embodiments of the invention. Referring to FIG. 8, the sender 122 at a local terminal 124, such as a financial institution's ATM or a PC serving as an on-line banking terminal, enters a selection for a transfer of funds to a recipient, for example, in another country and accesses a payments application for that country in the sender's own language. A local FEP 126 coupled to the terminal 124 processes the transaction and routes messages to a destination FEP 128 in the other country via a network switch 130 which also has access to a payee list bank locator destination table 132 and a local processor 134.

Referring further to FIG. 8, the destination country's FEP 128 generates a withdrawal-type transaction to verify available funds and initiates settlement before approving and processing the transaction. The local processor 134 approves the "withdrawal" and posts a debit to the account of the sender 122. Settlement with the destination country takes place through customary processes, and rejected payments are returned through a credit transaction.

Figure 9:
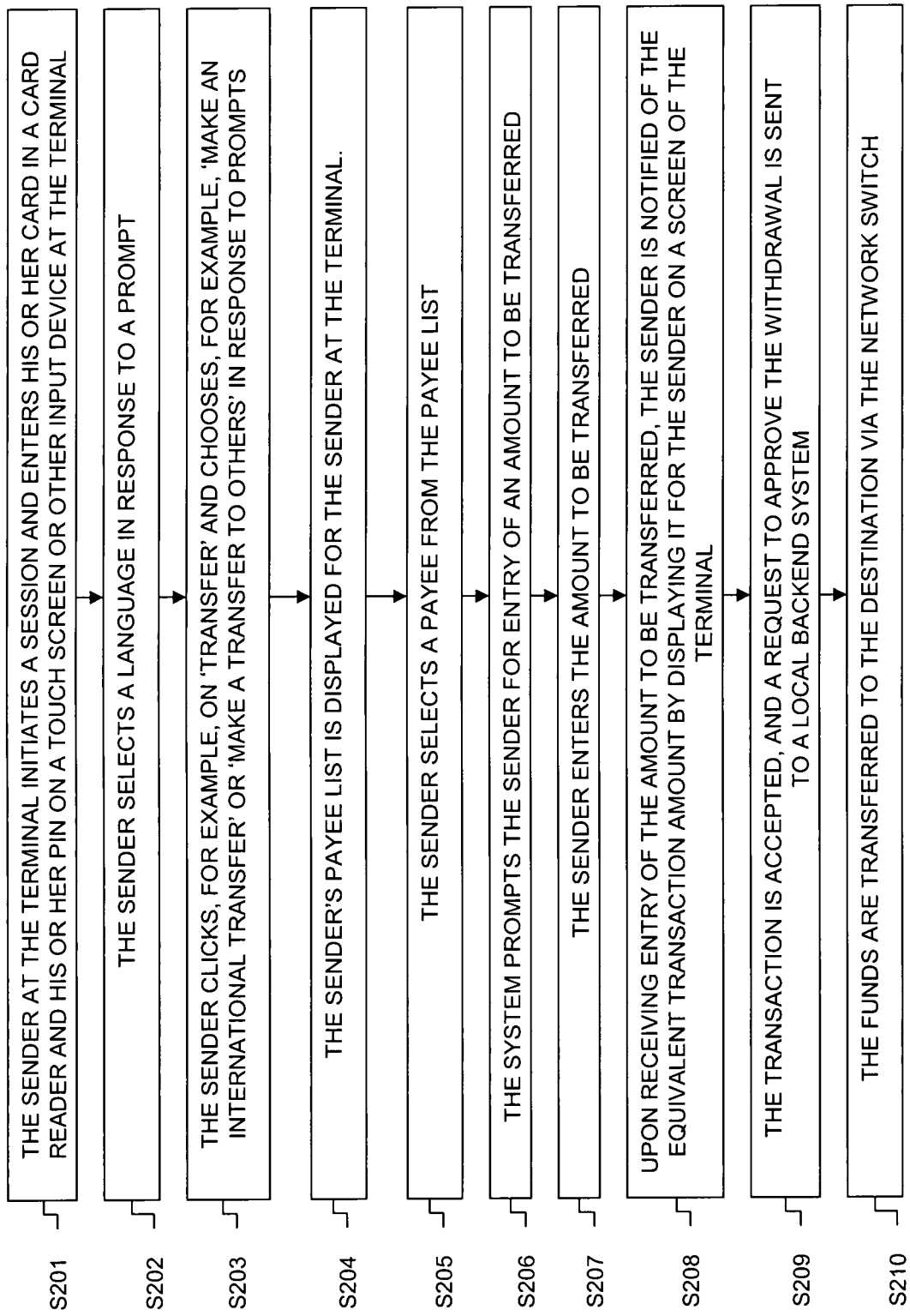
FIG. 9 is a flow chart that illustrates an example of the process of transferring funds utilizing the payee list for embodiments of the invention.

FIG. 9 is a flow chart that illustrates an example of the process of transferring money to a destination utilizing the payee list for embodiments of the invention. Referring to FIG. 9, at S201, the sender 122 at the terminal 124 initiates a session and enters his or her card in a card reader and his or her PIN on a touch screen or other input device at the terminal 124. At S202, the sender 122 selects a language in response to a prompt. At S203, the sender 122 clicks, for example, on 'Transfer' and chooses, for example, 'Make an International Transfer" or 'Make a Transfer to Others" in response to prompts.

Referring further to FIG. 9, at S204, the sender's payee list is displayed for the sender at the terminal 124, and at S205, the sender 122 selects a payee from the payee list. However, the sender 122 is not required to enter, for example, a destination account or financial institution for the recipient because that information is pre-stored in the payee list database along with the other information necessary for transferring funds to the selected payee. At S206, the system prompts the sender 122 for entry of an amount to be transferred, and at S207, the sender 122 enters the amount to be transferred. At S208, upon receiving entry of the amount, the sender 122 is notified of the equivalent transaction amount, for example, by displaying it for the sender 122 on a screen of the terminal 124.

Embodiments of the invention employ, for example, an ATM of the sender's financial institution as the terminal 124 at which the sender 122 selects his or her preferred payment application in response to prompts, and the terminal 124 is linked to a local processor or front end system (FEP) 126. At S209, the transaction is accepted, and a request to approve the withdrawal is sent to a local backend system (not shown), and at 210, the funds are transferred via the network switch 130, for example, to the international destination in a manner previously described herein.

The payee list for embodiments of the invention is global for transferring money, for example, to Europe and/or Asia and/or other areas of the world and resides in a database associated with or linked to the network switch 130. When the sender 122 accesses the payee list data, only the sender's own payee list is presented for the sender via the network switch 130. In addition, the network switch 130 provides the sender 122 with exchange rates and the like in order to enable the sender 122 to advise the recipient of the amount of local currency to be expected. Once the transaction is accepted by all concerned, the request to approve the withdrawal is sent to a local backend system (not shown). Thereafter, the funds are routed via the network switch 130, for example, to a destination host server 136.

Routing to Payee's Financial Institution

Embodiments of the invention involve the transfer of funds, for example, across international borders to be picked up by customers of a financial institution from ATMs of the financial institution. However, it is self-apparent that the number of ATMs deployed globally by a financial institution is finite, so that allowing funds to be picked up only through the ATMs of the particular financial institution is a severe limitation. Accordingly, still further embodiments of the invention involve the transfer of funds for pickup by recipients, for example, at access points other than financial institution ATMs.

Such embodiments allow the financial institution customer to transfer funds from the sender's financial institution across borders to a destination other than the sender's financial institution in another country, for example, via the sender's financial institution in the other country. In this aspect, the funds are transferred globally in a manner previously described herein from the sender's local financial institution to the sender's financial institution in another country and thereafter routed by the sender's financial institution in the other country to a further destination for the intended recipient.

Embodiments of the invention involve routing the funds by the sender's financial institution in the destination country, for example, to a different financial institution destination in the destination country for the intended recipient utilizing existing infrastructure. For example, upon receipt of the transferred funds by the sender's financial institution in the destination country, the funds can be routed to another financial institution in the destination country via local clearing systems analogous to the Automated Clearing House (ACH) Network in the U.S. For another example, the sender's financial institution in the destination country can route the funds to the other financial institution in the destination country utilizing a financial messaging system, such as the SWIFT messaging system. It is to be understood that these methods of routing the funds in the destination country are illustrative only and that embodiments of the invention contemplate any other fund-routing infrastructure.

In this aspect, the funds are routed by the sender's financial institution in the destination country utilizing existing infrastructure, for example, to an account of the intended recipient in another financial institution in the destination country. Thereafter, the recipient can access the funds in any way in which the recipient normally accesses funds in the account. For example, the recipient can access the funds by withdrawal from the recipient's account at a branch or via an ATM withdrawal with an ATM card.

FIG. 10 is a flow chart that illustrates an example of the process of transferring money and routing the transferred money to the payee's destination account utilizing the payee list for embodiments of the invention. Referring to FIG. 10, at S300, a subset of payees that is uniquely associated with the sender 122 and includes_at least one payee, and a destination account for the payee in a second financial institution is presented in the payee list database 132. At S301, the sender 122 enters a request at the terminal 124 for a transfer of funds, and at S302, a payee list is displayed for the sender 122 at the terminal 124 based at least in part on the data pre-stored in the payee list database 132.

Referring further to FIG. 10, at S303, the sender 122 enters a selection at the terminal 124 of the name of the at least one payee from the payee list and a requested transfer amount. At S304, the requested amount is transferred from the source account at the originating location of the first financial institution to a destination location of the first financial institution via the network switch 130, and at S305, the requested transfer amount is routed from the destination location of the first financial institution to the payee's destination account at the second financial institution.

It will be appreciated that the present invention provides many advantages. Users benefit through the availability of convenient and widespread access to transferred cash. Cash may be transferred across international borders, even to non-customer recipients. The transfers may be made virtually in real time (of course, time must be permitted for the sender to convey the authorization code and password to the recipient).

Additionally, the service provider benefits from the preferred invention. Apart from the goodwill generated by the invention, the service provider may charge service fees to the recipient and other appropriate fees.

A system and method for implementing funds transfers has now been described in fulfillment of the foregoing objects of the invention. Although the detailed description of the invention has been made in reference to the specific examples set forth above, many variations, modifications and alterations will be apparent to those skilled in the art without departing from the spirit and scope of the invention. The following claims are intended to encompass any such variations, modifications and alterations.

What is claimed is:

1. A method comprising:
   receiving, by a computer, an entry of data by a sender at a first electronic terminal, the entry of data comprising a name of at least one payee, a requested transfer amount, and an expiration date for a transfer of funds from a sender's source account to at least one payee's destination account;
   generating, by the computer, a transaction code;
   receiving, by the computer, an input of a code word from the sender at the first electronic terminal;
   upon generating the transaction code and receiving the code word, generating, by the computer, a transfer initiation file based on the entry of data by the sender;
   transmitting, by the computer, the transaction code and the code word to the at least one payee;
   transmitting, by the computer, the transfer initiation file to a second electronic terminal in communication with a destination host server computer;
   upon an input of the transaction code, the code word, and an amount of currency of no more than the requested transfer amount by the at least one payee in the second electronic terminal:
      converting, by a network switch computer, the requested transfer amount to a second transfer amount within a destination file accessible to the destination host server computer;
      routing, by the destination host server computer, the second transfer amount within the destination file to the at least one payee's destination account;
      causing, by the destination host server computer, the at least one payee activated second electronic terminal to dispense the amount of currency of no more than the second transfer amount;
      dispensing, by the at least one payee activated second electronic terminal, the amount of currency of no more than the second transfer amount; and
      updating, by the computer, the transaction initiation file based on the amount of currency dispensed at the at least one payee activated second electronic terminal.

2. The method of claim 1, further comprising:
   storing data in a payee list database consisting at least in part of a transfer method and a transfer currency.

3. The method of claim 2, further comprising:
   storing data in the payee list database consisting at least in part of a last transfer amount, a last transfer reference number, and a last transfer secret code.

4. The method of claim 3, further comprising:
   storing data in the payee list database consisting at least in part of a recipient business and a third party.

5. The method of claim 1, further comprising:
   receiving an entry of data in a payee list database from the sender during an online banking session with a home banking server.

6. The method of claim 1, further comprising:
   receiving an entry of data in a payee list database from the sender in person at a blanch.

7. The method of claim 1, further comprising:
   storing data in a payee list database that is accessible only by customers and employees.

8. The method of claim 1, further comprising:
   displaying, by the computer, a payee list at the first electronic terminal, wherein displaying the payee list for the sender at the first electronic terminal further comprises displaying the payee list for the sender at a self-service financial transaction terminal.

9. The method of claim 1, further comprising:
   displaying, by, the computer, a payee list at the first electronic terminal, wherein displaying the payee list for the sender at the first electronic terminal further comprises displaying the payee list for the sender at a computing device serving as an banking terminal.

10. The method of claim 1, wherein routing the second transfer amount from the destination file to the at least one payee's destination account further comprises routing the second transfer amount to the at least one payee's destination account via a destination location clearing house network.

11. The method of claim 1, wherein routing the second transfer amount from the destination file to the at least one pay'ee's destination account further comprises routing the second transfer amount to the at least one payee's destination account via a financial messaging system.

12. The method of claim 1, wherein routing the second transfer amount from the destination file to the at least one payee's destination account further comprises allowing the at least one payee to access the second transfer amount in the at least one payee's destination account.

13. The method of claim 12, wherein allowing the at least one payee to access the second transfer amount in the at least one payee's destination account further comprises allowing the at least one payee to withdraw the second transfer amount from the at least one payee's destination account at a third electronic terminal.

14. The method of claim 12, wherein allowing the at least one payee to access the second transfer amount in the at least one payee's destination account further comprises allowing the at least one payee to withdraw the second transfer amount from the at least one payee's destination account via a withdrawal at an automated teller machine.

15. A system comprising:
   a computer configured to:
      receive an entry of data by a sender at a first electronic terminal, the entry of data comprising a name of at least one payee, a requested transfer amount, and an expiration date for a transfer of funds from a sender's source account to a payee's destination account;
      generate a transaction code;
      receive an input of a code word from the sender at the first electronic terminal;

upon generating the transaction code and receiving the code word, generate a transfer initiation file based on the entry of data by the sender;

transmit the transaction code and the code word to the at least one payee; and transmit the transfer initiation file to a second electronic terminal in communication with a destination host server computer;

a network switch computer configured, upon an input of the transaction code, the code word, and an amount of currency of no more than the requested transfer amount by the at least one payee in the second electronic terminal, to:

convert the requested transfer amount to a second transfer amount within a destination file accessible to the destination host server computer;

the destination host server computer configured to:

route the second transfer amount within the destination file to the at least one payee's destination account; and cause the at least one payee activated second electronic terminal to dispense the amount of currency of no more than the second transfer amount;

the at least one payee activated second electronic terminal configured to:

dispense the amount of currency of no more than the second transfer amount; and the computer configured to:

update the transaction initiation file based on the amount of currency dispensed at the at least one payee activated second electronic terminal.

\* \* \* \* \*